United States Patent Office 3,532,681
Patented Oct. 6, 1970

---

3,532,681
POLYMERS OF 4-CYANO-1-BUTENE
Karl-Erwin Schnalke, Cologne-Flittard, and Nikolaus Schön, Leverkusen, Germany, assignors to Farbenfabriken Bayer Aktiengesellschaft, Leverkusen, Germany, a corporation of Germany
No Drawing. Filed Oct. 24, 1967, Ser. No. 677,721
Claims priority, application Germany, Jan. 7, 1967, F 51,200
Int. Cl. C08f 3/74
U.S. Cl. 260—88.7     3 Claims

ABSTRACT OF THE DISCLOSURE

Solid, colorless water insoluble polymer of 4-cyano-1-butene produced by contacting said monomer under anhydrous conditions in the absence of oxygen in liquid ammonia with 0.05 to 5 parts by weight of said monomer of a metal of Group Ia or Group IIa of the Periodic System or an anhydride thereof at a temperature of from −80 to −33° C.

---

Polymers of 4-cyano-1-butene can be obtained by polymerising 4-cyano-1-butene in liquid ammonia as solvent in the presence of a metal or metal amide from Groups Ia and IIa of the Periodic System at a temperature from −80 to −33° C.

This invention relates to polymers of 4-cyano-1-butene and to a process for their preparation. 4-cyano-1-butene is an olefin obtained for example from 1,4-butadiene and hydrocyanic acid (cf. Annalen 572 (1951), p. 50).

It has been found that polymers of 4-cyano-1-butene can be obtained by polymerising 4-cyano-1-butene in liquid ammonia as solvent in the presence of a metal or metal amide from Groups Ia and IIa of the Periodic System at a temperature from −80 to −33° C.

Suitable catalysts include the metals or metal amides of Groups Ia and IIa of the Periodic System of Mendeléev, i.e. lithium, sodium, potassium, rubidium, cesium, magnesium, calcium, strontium or barium or their amides. The catalysts may be used in the form of solutions or suspensions in liquid ammonia.

The catalysts used according to the invention are generally employed in quantities from 0.05 to 5 parts by weight per 100 parts by weight of monomer or monomer mixture, and preferably in quantities from 0.1 to 3 parts by weight.

To carry out the process, it is possible for example to dissolve or suspend the catalyst in purified liquid, anhydrous ammonia, and gradually to add the monomer or monomers to the resulting solution or suspension.

Polymerisation is carried out as a precipitation polymerisation at a temperature from −80 to −33° C., preferably from −45 to −33° C., and at atmospheric pressure. Polymerisation has to be carried out in the strict absence of oxygen and water to prevent decomposition of the catalyst. Accordingly, it is advantageous to operate in a dry inert gas atmosphere, for example in an atmosphere of nitrogen or argon.

Polymerisation of 4-cyano-1-butene begins after a short time under the aforementioned conditions, giving high yields of solid, colourless polymers.

The polymers of 4-cyano-1-butene are insoluble in liquid ammonia and, for this reason, are precipitated during polymerisation. They may be isolated by exaporating the ammonia.

Any residual ammonia may be removed from the polymers by washing them with water and/or dilute acids. To remove any residual monomers, the polymer may with advantage be dissolved in a solvent suited to this purpose and reprecipitated by the addition of, for example, water or ether. Examples of solvents suitable for this purpose include acetone, acetonitrile, ethyl acetate, chloroform and methylene chloride.

The polymerisation is effected at the C—C double bond of the monomers. Thus the polymers constitute compounds of the formula

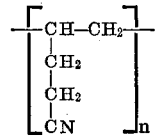

wherein $n$ is a number above 100. The part of the formula in brackets constitutes the recurring structural element of the polymer.

The polymers obtained in accordance with the invention are colourless solids which are insoluble in water, alcohol, ether, petroleum ether and carbon tetrachloride. By contrast, they are soluble in the solvents mentioned above in connection with the purification. Their mean molecular weight is e.g. between 1000 and e.g. approximately 250,000.

The polymers of 4-cyano-1-butene, thus prepared, as novel and as a plastic constitute a thermoplastic moulding material. This product may be used for producing e.g. foils and sheets.

EXAMPLE 1

Approximately 300 ml. of ammonia dried over sodium are distilled into a thoroughly heated flask filled with nitrogen. 0.1 g. of sodium blended with toluene is then dissolved in the ammonia with stirring.

20 ml. (16.6 g.) of 4-cyano-1-butene are then added dropwise over a period of 15 minutes during which the temperature is kept within the range from −40 to −33° C. The reaction solution loses its deep-blue colouring after the first drops of monomer have been added to it, gradually turning yellow. Stirring is continued for 6 hours at −40° C., and a yellow polymer is precipitated in the reaction vessel. Following the addition of 1 g. of ammonium chloride, the ammonia is evaporated and the polymer is taken up in acetone and precipitated by pouring into acidified water. The precipitated polymer is collected on a suction filter, washed with water, dissolved in acetone, and reprecipitated by pouring the resulting solution into acidified water. The white to pale-yellow polymer is suction-filtered, washed and dried in a drying cabinet at 50° C. Yield=84% of the theroetical.

EXAMPLE 2

300 ml. of anhydrous ammonia are condensed in a reaction flask in the absence of moisture and atmospheric oxygen. The liquid ammonia is brought to −40° C. and 0.3 g. of lithium amide are added to it. 40 ml. (33.2 g.) of 4-cyano-1-butene are then added dropwise over a period of 20 minutes. Stirring is continued for 6 hours, followed by the addition of 3 g. of ammonium chloride. The ammonia is then evaporated, and the precipitated yellow polymer is dissolved in acetone and precipitated by pouring into acidified water. The polymer thus obtained is preferably dissolved and reprecipitated. In this way, 31 g. (91% of the theoretical of a pale yellowish powder are obtained and dried at 50° C. in a drying cabinet.

What is claimed is:
1. A process for producing a polymer of 4-cyano-1-butene which comprises contacting 4 - cyano - 1 - butene under anhydrous conditions and in the absence of oxygen in liquid ammonia with 0.05 to 5 parts by weight per 100 parts by weight of said 4-cyano-1-butene of a metal of Group Ia or from Group IIa of the Periodic System of

Mendeléev or of an amide of one of said metals at a temperature of from −80 to −33° C.

2. The process of claim 1 wherein said temperature is from −45 to −33° C.

3. A solid, colorless water insoluble polymer of 4-cyano-1-butene wherein the essential recurring unit is of the formula

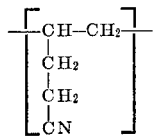

References Cited

UNITED STATES PATENTS

| | | | |
|---|---|---|---|
| 2,352,515 | 6/1944 | Bruson | 260—88.7 |
| 2,677,676 | 5/1954 | Nichols et al. | 260—88.7 |

OTHER REFERENCES

Kurtz: Annalen, 572 (1951), p. 50.
Beilstein, vol. 2, 3rd ed., p. 1299.

HARRY WONG, JR., Primary Examiner

U.S. Cl. X.R.

260—31.2, 32.4, 32.8, 33.8, 85.5